US009219761B2

(12) United States Patent
Ståhl (10) Patent No.: US 9,219,761 B2
(45) Date of Patent: Dec. 22, 2015

(54) DEVICE, SOFTWARE MODULE OR SYSTEM FOR GLOBAL REAL-TIME TELECOMMUNICATION

(76) Inventor: Karl-Erik Ståhl, Värmdö (SE)

( * ) Notice: Subject to any disclaimer, the term of this patent is extended or adjusted under 35 U.S.C. 154(b) by 233 days.

(21) Appl. No.: 13/362,582

(22) Filed: Jan. 31, 2012

(65) Prior Publication Data

US 2013/0089187 A1      Apr. 11, 2013

Related U.S. Application Data

(60) Provisional application No. 61/544,760, filed on Oct. 7, 2011.

(51) Int. Cl.
| | | |
|---|---|---|
| *H04M 1/24* | (2006.01) | |
| *H04L 29/06* | (2006.01) | |
| *H04L 12/14* | (2006.01) | |
| *H04M 15/00* | (2006.01) | |
| *H04L 12/24* | (2006.01) | |

(52) U.S. Cl.
CPC ........ *H04L 65/1036* (2013.01); *H04L 12/1482* (2013.01); *H04L 63/029* (2013.01); *H04M 15/41* (2013.01); *H04M 15/43* (2013.01); *H04M 15/57* (2013.01); *H04L 41/0213* (2013.01); *H04L 41/5022* (2013.01); *H04M 15/59* (2013.01)

(58) Field of Classification Search
CPC ....................................................... H04M 3/36
USPC .............. 379/32.01, 112.01, 112.1, 133, 126, 379/88.17, 266.1; 370/232, 233, 234, 253
See application file for complete search history.

(56) References Cited

U.S. PATENT DOCUMENTS

| | | | |
|---|---|---|---|
| 5,694,548 A | 12/1997 | Baugher et al. | |
| 5,742,905 A * | 4/1998 | Pepe et al. | 455/461 |
| 5,768,527 A | 6/1998 | Zhu et al. | |
| 6,292,465 B1 * | 9/2001 | Vaid et al. | 370/230 |
| 6,772,335 B2 | 8/2004 | Curtis et al. | |
| 7,457,293 B2 | 11/2008 | Kokado | |
| 7,570,765 B1 * | 8/2009 | Eslambolchizadeh | 380/257 |
| 7,827,301 B2 | 11/2010 | Allen | |
| 7,961,694 B1 | 6/2011 | Chan et al. | |
| 2005/0047345 A1 * | 3/2005 | Suh | 370/235 |
| 2005/0152378 A1 | 7/2005 | Bango et al. | |
| 2006/0146792 A1 * | 7/2006 | Ramachandran et al. | 370/352 |
| 2006/0239253 A1 | 10/2006 | Gallant et al. | |
| 2006/0245367 A1 | 11/2006 | Jeffery et al. | |
| 2008/0114690 A1 | 5/2008 | Skidmore et al. | |
| 2008/0273523 A1 | 11/2008 | Menditto et al. | |
| 2009/0059904 A1 | 3/2009 | Eikkula | |
| 2010/0057909 A1 | 3/2010 | Varadarajan et al. | |

(Continued)

FOREIGN PATENT DOCUMENTS

| | | |
|---|---|---|
| EP | 1 148 749 A2 | 10/2001 |
| WO | WO 2005/125101 A1 | 12/2005 |

*Primary Examiner* — Yosef K Laekemariam (57) ABSTRACT

A telecommunication device for real-time communication at a border between a global transport network and a local area network may allow traffic using real-time communication protocols to traverse a firewall, classified real-time traffic over best effort traffic for prioritization over the global transport network, measure and collection information about an application, its usage and prioritization used over the global transport network, create call detail records that can be used by a service provider for billing purposes; and deliver the call detail records to the service provider.

21 Claims, 4 Drawing Sheets

(56) References Cited

U.S. PATENT DOCUMENTS

| | | |
|---|---|---|
| 2010/0183002 A1 | 7/2010 | Gallant et al. |
| 2010/0226252 A1 | 9/2010 | Gogic et al. |
| 2010/0239077 A1* | 9/2010 | Michaelis et al. ......... 379/93.02 |
| 2010/0257078 A1 | 10/2010 | Poppitt et al. |
| 2010/0257079 A1 | 10/2010 | Haiyan |
| 2011/0010461 A1* | 1/2011 | Lassila et al. ................. 709/231 |
| 2011/0022660 A1 | 1/2011 | Liu |

\* cited by examiner

DEVICE, SOFTWARE MODULE OR SYSTEM FOR GLOBAL REAL-TIME TELECOMMUNICATION

CROSS-REFERENCE TO RELATED APPLICATIONS

This application is based upon and claims the benefit of priority to U.S. Provisional Application Ser. No. 61/544,760, filed Oct. 7, 2011, the disclosure of which is incorporated herein by reference in its entirety.

BACKGROUND

1. Field

This telecommunication device, software module, or system relates generally to the field of telecommunication and more specifically to allowing better performance, functionality and business models for communication on modern public telecommunication transport networks, to allow both new services and the current services used on the Internet and on the Public Switch Telephone Network.

2. Description of the Related Art

The current global telephone network, the PSTN (Public Switched Telephone Network), is built for voice communication of limited bandwidth (only 3.5 kHz). Broadband networks, e.g. the Internet, can also be used for real-time person-to-person communication, e.g. voice communication, often called VoIP (Voice over IP). The Internet transports data between endpoints, regardless of the data content or the application and is therefore called a transport network.

Although such technology has the potential of multimedia communication beyond the Plain Old Telephony Service (POTS), e.g. video, presence and instant messaging, VoIP has been used by telecom operators to replace pieces of the PSTN, still only offering POTS. Further, the telecom operators' VoIP networks primarily connect to each other for voice traffic, counting voice minutes for billing. Thus, those networks are not suitable for global multimedia communication.

Further, the potential of connecting traffic directly between users, over a global transport network, is not used in the current VoIP network, since the equipment for measuring usage so that the telecom operators can bill their customers is located centrally in service providers' VoIP networks.

For telecom operators to offer global multimedia communication, a global packet based telecommunication network with higher quality than the Internet—a quality WAN (Wide Area Network) is proposed. Such a WAN would be global transport network.

The proposed quality WAN consists of multiple telecom carriers having peered their packet based quality networks (typically IP networks). This is similar to the public Internet, but on the quality WAN, packets can be given different priorities (e.g. using IP level TOS or DSCP bits), while on the Internet all packets have the same priority.

The quality WAN may be connected to the public Internet via routers or gateways, but usage must be charged separately from the Internet to avoid that all traffic will be on the quality WAN with the highest priority level and to motivate telecom operators to deploy and offer such quality WAN.

Generally, at the border between a LAN (Local Area Network) and a WAN (e.g. the Internet), there is Firewall, often including a NAT (network address translation), for protecting the integrity of the LAN, but usually also hindering person-to-person communication using standardized real-time communication protocols like SIP (session initiation protocol).

Virtual Private Networks (VPN), in the form of private IP lines e.g. over MPLS, or encrypted tunnels over public networks, are sometimes mentioned as solutions to some of the above mentioned problems, but—in a best case—only moves the problem to be resolved more centrally in the network. In addition, VPN solutions are complex, costly and introduce problems and restrictions in themselves, by not utilizing the advantages provided by a global quality WAN. Furthermore, VPN solutions introduce security issues when the private LAN of the user is moved into the service provider's space, often resulting in customers wanting a firewall towards the VPN, again introducing the problems with real-time communication that the VPN solution was supposed to resolve.

SUMMARY

In one aspect, a telecommunication device for real-time communication at a border between a global transport network and a local area network may include means for traffic using real-time communication protocols to traverse a firewall, means for classifying real-time traffic over best effort traffic on the global transport network, means for measuring and collecting information about an application and prioritization used over the global transport network, means for creating call detail records that can be used by a service provider for billing purposes; and means for delivering the call detail records to the service provider.

In another aspect, a telecommunication device for transferring real-time traffic between a global transport network and a local area network may include a traverser, the traverser allowing traffic using real-time communication protocols to traverse a firewall between the global transport network and the local area network, a classifier, the classifier classifying real-time traffic for having higher priority than best effort traffic on the global transport network, a meter, the meter measuring the higher priority real-time traffic and collecting information about an application and prioritization of the real-time traffic used over the global transport network, a call detail record creator, the call detail record creator creating call detail records that can be used by a service provider for billing purposes, the call detail records including information about the communicating parties, the application, the usage and the prioritization used over the global transport network; and a deliverer for delivering the call detail records to the service provider.

The above-described embodiments of the present invention are intended as examples, and all embodiments of the present invention are not limited to including the features described above.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Reference may now be made in detail to embodiments of the present invention, examples of which are illustrated in the accompanying drawings, wherein like reference numerals refer to like elements throughout.

A telecommunication device for global multimedia real-time person to person telecommunication services to be offered by telecom operators is proposed to include capabilities such as delivering services to users on a local area network (LAN), thus resolving the firewall traversal and network address translation (NAT) issue.

Another capability of the telecommunication device is to measure the usage of the quality wide area network (WAN) so the operator can bill the customer.

Another capability of the telecommunication device is to classify outgoing traffic from the LAN so the quality WAN is used for the multimedia communication.

The location of the telecommunication device is at the border between a WAN or a global transport network and the LAN, typically at the customer location where an ordinary firewall is located. The device can operate in parallel with an ordinary firewall or replace the firewall.

A proxy for real-time communication, e.g. a session initiation protocol (SIP), real-time streaming protocol (RTSP) or web-based real-time communication (WebRTC) proxy, is included to be able to provide some of the mentioned functions. A proxy receives and reads a signaling message for the specific protocol, then can acts upon the information therein, can rewrite the message and then pass it on to an endpoint or to another proxy. This proxy or other means have the ability to route the real-time traffic to its destination.

In one aspect, a system, device or software module for global real-time communication includes one or several of the above mentioned functions in a telecommunication device at the border between the global transport network and a local area network (LAN), where a firewall gives the LAN its protected private environment, but usually also hinders real-time communication using protocols like SIP, RTSP or WebRTC.

The firewall does not allow traffic from the WAN to enter the LAN unless it is correct traffic, and the traffic flow is initiated from the LAN side, or if the firewall is specifically configured to allow certain traffic to enter that LAN.

Further, if the firewall includes a network address translator (NAT), private addresses are used on the LAN, so endpoints at the LAN cannot be directly addresses from the WAN side. One address on the WAN side is often shared by multiple endpoints on the LAN. Endpoints on the LAN therefore have to initiate traffic from their side, before traffic can be received from the WAN via the firewall/NAT using the path initiated from the LAN.

Ordinary firewalls/NATs therefore hinder real-time traffic, where an endpoint on a LAN is to be called. The firewall usually blocks the call from the WAN, and if the firewall is opened for incoming calls, the signaling message cannot be passed on to the right endpoint at the LAN, since the NAT function has made those addresses private.

In addition to the call set-up done by signaling messages, there is also the media part of real-time communication, such as voice streams that have to flow between the communicating parties. Media paths between the parties may be requested in the call setup signaling, but an ordinary firewall is not aware of this and does not open such media paths.

The telecommunication device, software module or system to realize global real-time communication includes one or several of the following functions or methods at the border between a global WAN and a local area network, such as:
  delivering real-time multimedia communication to users on a LAN, by including session border controller (SBC) functionality for NAT/Firewall traversal
  enabling and allowing prioritized real-time traffic to connected devices
  classifying traffic to determine the prioritization or quality level to be used
  counting and reporting the usage of prioritized traffic, to allow the telecom operator to bill such usage separate from the public Internet usage.

The telecommunication device, is preferably combined with, or built into, a firewall or routing device (e.g. a SIP, RTSP (real-time streaming protocol) or WebRTC (real-time communication) proxy) or access modem, where the called address (e.g. E164 telephone number, or SIP address) is resolved to a WAN network address (e.g. an IP address) which the traffic can be routed to. Other functions, such as SIP Server, SIP registrar, PBX (private branch exchange), gateways, call and message policy handler, gateways for interoperability and other functionality may also be integrated.

Telecom operators today only offer:
  a) the POTS (plain old telephone service), at low—but guaranteed—bandwidth (3.5 kHz) and usually at session based high price per bandwidth used, and
  b) the Internet with high bandwidth and usually at flat rate and low price per bandwidth, but at equal best effort quality.

Telecom operators have used VoIP technology to produce a) above at lower cost.

The capability to offer global multimedia (wide band) communication with guaranteed quality exists in the core of today's IP networks, but is only offered as the subset b) above.

In one aspect, a device allows telecom operators to offer a better service and allow better usage of their networks.

The telecommunication device, software module, or system also allows telecom operators to charge for better services. They get lower cost and more reliable infrastructure by eliminating soft switches and SBCs (session border controllers) in their VoIP infra structure.

Figure 1:
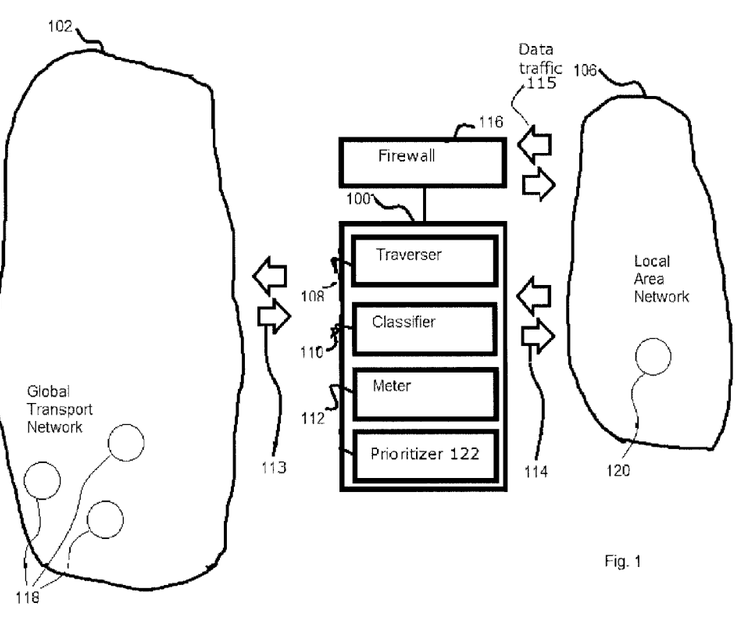
FIG. 1 shows a telecommunication device according to an embodiment.

In FIG. 1 is shown a telecommunication device 100 for real-time communication at a border between a global transport network 102 and a local area network 106.

The telecommunication device 100 may include a processor, memory both random and serial, hardware, and software. The random access memory may be, for example, a solid-state device. The serial access memory may be, for example, a disk. The processor may be, for example, a microprocessor, a digital signal processor, or a CPU (central processing unit).

The various parts of the telecommunication device, such us the traverser 108, the classifier 110, the meter 112, the prioritizer 122, the gateway 126, the gateway 127, the PBX 128, the registry 130, the firewall 134, the proxy 136 can be implemented in software modules running on a processor and connected together.

The border may comprise a firewall 116. Traffic 113, 114, 115 may go in both directions between the global transport network 102 to the local area network 106.

The global transport network 102 may be comprised of a plurality of routers or servers 118. The routers or servers 118 may include processors, memory both random and serial, hardware, and software.

The local area network 106 may be served by routers or servers 120, which may include a processor, memory both random and serial, hardware, and software. Users that wish to use real-time communication, like telephony (voice), video conferencing, instant messaging (IM), presence and similar applications, may be connected to the local area network 106 (LAN) and communicate with users on the global transport network 102, or most often with users connected to other LANs, and those LANs are connected to the global transport network. In one embodiment, the telecommunication device 100 includes a traverser 108 that allows real-time traffic to traffic 114 to traverse the border between the global transport network 102 and the local area network 106, through the telecommunication device 100, since real-time traffic do not go through the firewall 116.

Figure 2:
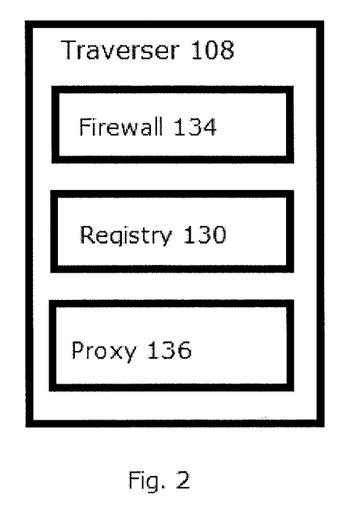
FIG. 2 shows internal components of a traverser.

As shown in FIG. 2, a traverser 108 may include a proxy 136 or other means for inspecting and changing signaling messages to set-up real-time communication between parties on different sides of the traverser 108. Signaling messages contain information about participants in the communication. The traverser 108 has knowledge about the parties' addresses, which may be global or private on the LAN being served. The traverser 108 can instruct its internal firewall 134 to open paths between the parties for both the signaling and for the media. The traverser 108 will also change the signaling messages to match information such as addresses on the WAN and the LAN side of the communication before the signaling message is passed on.

The traverser 108 has knowledge about the endpoint's private addresses on the LAN 106, either by configuration in registry 130 in the traverser 108 or by the endpoints having registered their addresses through a registration message to the registry 130, which may be a SIP registrar.

The firewall 134 may also include NAT to perform the same translation between addresses on the WAN and LAN side.

In another embodiment of the telecommunication device 100, the firewall 134 may also handle data traffic, and can then also replace the firewall 116.

The telecommunication device 100 may also include a classifier 110 for classifying real-time traffic 114. The classifier 110 determines how traffic will be classified for handling by the prioritizer 122. The classifier 110 may classify real-time traffic over best effort traffic, based on the service or services to which a caller is subscribed. In the alternative, the classifier 110 may classify the traffic 114 based on an interface used, based on an address or a port used, based on the called party, or based on already existing quality marketing of the data packets when they are received through an interface 124. The proxy 136 or other means may give information to the classifier 110 about which protocols and which services are being used and which endpoints that participate. The classification may assign various quality levels to traffic and may also classify based on configuration.

The telecommunication device 100 may also include a prioritizer 122 for giving classified traffic priority over best effort traffic. The prioritizer 122 can both prioritize traffic internally in the telecommunication device 100 by arranging traffic in several outgoing queues to interfaces and also by instructing the WAN or LAN to prioritize classified traffic. Such instruction can be by marking IP packets with TOS or DSCP bits, by requesting reservation of a certain bandwidth, by selecting a specific network or subnet, or by selecting a higher quality WAN through an alternative interface 124.

The telecommunication device 100 may also include a meter 112 for measuring and collecting information about traffic transported over the global transport network 102. The meter 112 may also create call detail records that can be used by a service provider for billing purposes, and deliver those call detail records to the service provider. The meter 112 measures the traffic from and to WAN interfaces. It can store the application being used, what quality level that is requested and the quality that is delivered. It can measure both the totally transferred traffic, or traffic per session or per call. Call detail records can thereafter be created by combining such data with information from a proxy 136 or other means, about the caller and the called party, their addresses, how long the call was, at which time it occurred and which WAN interface that was used.

Call detail records can thereafter be delivered, during or directly after the call, or later in a batch where many call detail records have been collected. Call detail records can be delivered using protocols such as Radius or SIP Publish, or over a WAN using a secure protocol like TR-069, Diameter, or SFTP.

TR-069 is a protocol for management of customer placed equipment. It can receive call detail records via inform messages and store the call detail records in its database for further processing like billing by a service provider.

A network provider may want to assure that the meter 112, the creation of call detail records and their delivery is not falsified in a case of a customer placed telecommunication device. That can be done by authenticating the presence of a telecommunication device, of its identity and of its software. One method for such authentication may be via a management system that includes authentication methods. The TR-069 management protocol includes authentication of devices, their identity and allows the signature of software in the telecommunication device to be checked, and can assure that the call detail records and their delivery are not tampered with. In case such functions have been tampered with, the access can be shut down by the management system.

Figure 3:
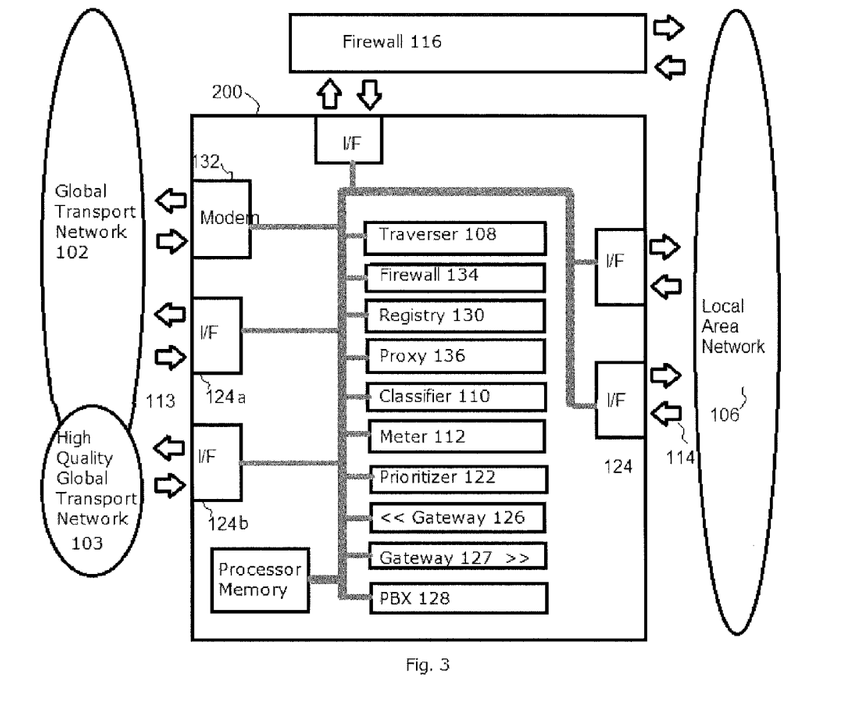
FIG. 3 shows a telecommunication device according to another embodiment.

In FIG. 3 is shown a telecommunication device 200 according to a further embodiment. As shown in FIG. 3, the telecommunication device 200 is at a border between a global transport network 102 and a local area network 106. The border may comprise a firewall 116.

In addition to the traverser 108, the classifier 110, the meter 112, and the prioritizer 122 described with respect to the telecommunication device 100 shown in FIG. 1 and the firewall 134, the registry 130, and the proxy 136 described with respect to the traverser 108 in FIG. 3, the telecommunication device 200 may also include several WAN interfaces 124 for connecting to WANs with different quality levels.

The telecommunication device may also include several WAN interfaces 124 for allowing real-time communication on the local area network 106. In a further embodiment, several WAN interfaces 124 may each connect to WANs of different quality levels.

The real-time communication, in one embodiment, may be via a first WAN interface 124a connected to the Internet and a second WAN interface 124b connected to a higher-quality network 103. In one embodiment, the telecommunication device 200 may include a registry 130 for keeping track of the user's current location. In another embodiment, the telecommunication device 200 may include PBX functionality 128. In a further embodiment, the telecommunication device 200 may include an access modem 132, such as a DSL modem, a cable modem, a GPON modem, an Ethernet router, an MPLS router, or a T1 router for connecting to a transport network. Such an access modem will function like a WAN interface.

In a still further embodiment, the telecommunication device 200 may include a gateway 126 for communicating with a second network. In this embodiment, the gateway 126 may make the second network compatible with the telecommunication device 200. The second network may be a public switched telephone network connected via a network-placed gateway over a WAN. The connection to the PSTN may use a standardized recommendation like SIPconnect or a telephony server provider's own recommendation.

The gateway 127 may be used for communicating with a second telecommunication device on the local area network 106. In this case, the second telecommunication device may be for the public switched telephone network. The second telecommunication device may be a telephone or a PBX.

In a further embodiment, the gateway 126 may be used to communicate with the second telecommunication device on the local area network where the second telecommunication device is not compatible with an intended communication participant, which may use a protocol like H.323, Skinny or MGCP (media gateway control program) instead of a commonly used protocol like SIP.

Figure 4:
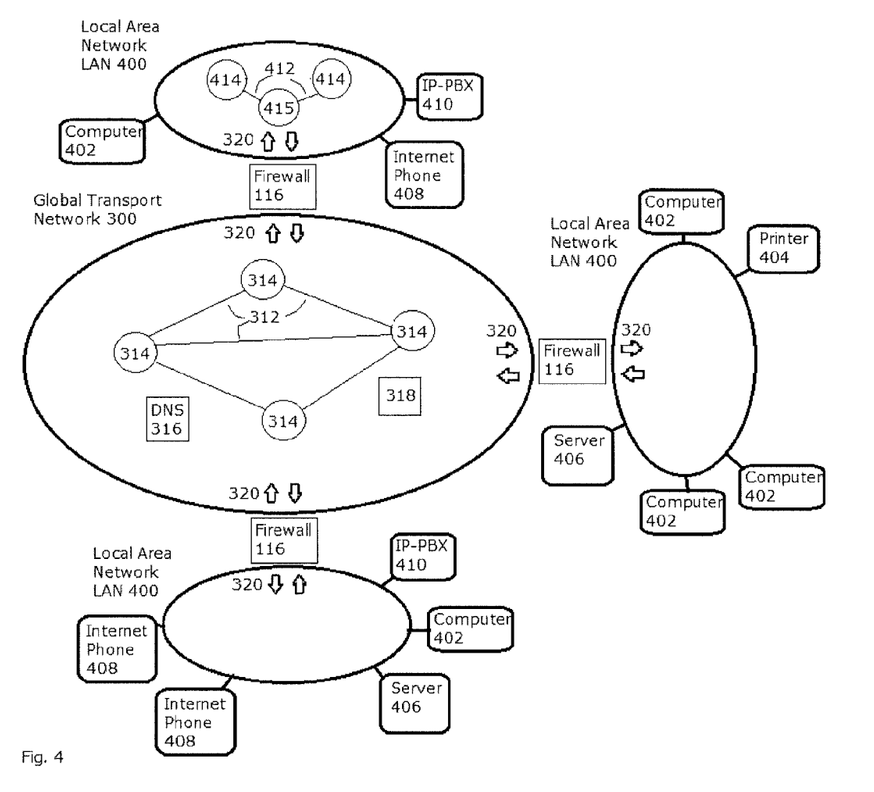
FIG. 4 shows a global transport network and local area networks (LAN).

In FIG. 4 is shown a global transport network 300. The global transport network 300 may include optical or other cables 312 or radio links connected by servers or routers 314 to form a network. Users as well as servers, like DNS servers 316 for translation of symbolic addresses to actual addresses, or application servers 318, may be connected to the global transport network, but mostly these endpoints are instead connected to local area networks 400 (LANs), being protected and shielded off from the global transport network by a firewall 116. The firewall may also include network address translation (NAT) giving devices connected to the LAN private addresses, so they cannot directly be addressed from the global transport network 300.

The purpose of a global transport network is to transport traffic 320 between users and servers at different locations, between LANs at different locations and between LANs and users and servers at different locations. Many can access the global transport network, so it is not private. Many network service providers may have connected their networks to form a global transport network.

The global transport data network normally transports the traffic without interfering with it. The Internet is a global transport data network. The Internet currently transports all traffic as best effort, which means that real-time traffic cannot be prioritized by setting TOS or DSCP bits in IP packets.

In FIG. 4 is also shown local area networks (LANs) 400. A LAN 400 may include copper or other cables 412 or wireless radio access like Wi-Fi, connected by switches 415 or routers 414 to form a network, using protocols like IP on top of Ethernet, token ring, or ARCNET. Users use computers 402 and associated devices such as printers 404 and a server 406. The LAN 400 may also include real-time communication devices such as Internet phones 408 or an IP-PBX 410. Real-time devices are often for person to person communication. The server 406, in particular, may have applications and data storage that are shared in common by the computers 402. A suite of application programs may be kept on the server 406 for users to download and run on one of the computers 402. A user of one of the computers 402 may be able to share files with other users of other computers 402 at the server 406. Finally, the LAN 400 might be administered by a single administrator.

A LAN 400 is a private network, for home or company users, that is secure and protected from the global transport network by a firewall 116.

A LAN may also be used by a service provider to have its application server on. The firewall 116, keeping the LAN secure and private from the global transport network, then have to open paths for the provided application, so it be used over the global transport network.

Therefore, according to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The telecommunication device comprises a controller (CPU) (e.g., a hardware logic circuitry based computer processor that processes or executes instructions, namely software/program), computer readable recording media, transmission communication media interface (network interface), and/or a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on computer-readable recording media. Examples of the computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as wired network or wireless network, for example, by being incorporated in a carrier wave. The data signal may also be transferred by a so-called baseband signal. A carrier wave can be transmitted in an electrical, magnetic or electromagnetic form, or an optical, acoustic or any other form.

All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A telecommunication device for transferring real-time traffic between a global transport network and a local area network, comprising:

a traverser, the traverser allowing traffic using real-time communication protocols to traverse a firewall between the global transport network and the local area network;
a classifier, the classifier classifying real-time traffic for having a higher priority than best effort traffic on the global transport network at a border between the global transport network and the local area network;
a meter, the meter measuring the higher priority real-time traffic and collecting information about an application and a prioritization of the real-time traffic used over the global transport network at the border between the global transport network and the local area network;
a call detail record creator, the call detail record creator creating call detail records that can be used by a service provider for billing purposes at the border between the global transport network and the local area network, the call detail records including the information about the application and the prioritization used over the global transport network;
a deliverer for delivering the call detail records to the service provider;
a proxy at the border between the global transport network and the local area network providing information for the call detail records and having an ability to route real-time traffic; and
a converter in the telecommunication device, at the border between the global transport network and the local area network, for converting a telephone number or other form of address to an address that the proxy can use to route the real-time traffic using a database lookup.

2. The telecommunication device of claim 1, further comprising:
a gateway, the gateway communicating with a second telecommunication device on the local area network wherein the second telecommunication device is not compatible with an intended participant of the communication.

3. The telecommunication device of claim 2, wherein the second telecommunication device uses a protocol selected from the group consisting of:
H.323,
MGCP, and
a protocol different from a communication protocol used by an intended participant of the communication.

4. The telecommunication device of claim 1, further comprising a processor for executing a program in the telecommunication device at the border between the global transport network and the local area network, the program performing a function selected from the group consisting of:
routing real-time traffic between two communicating parties,
authenticating the call detail record creator for creating and delivering call detail records,
delivering the call detail records over the global transport network using a secure protocol,
delivering the call detail records to a party different than the transport network service provider,
delivering the call detail records to several parties,
routing a call to a destination over the global transport network.

5. The telecommunication device of claim 4, wherein the secure protocol used to deliver the call detail records is selected from the group consisting of:
TR-069,
Diameter, and
SFTP.

6. The telecommunication device of claim 1, wherein the real-time traffic is classified over the best effort traffic on the global transport network based on a characteristic selected from the group consisting of:
a service to which a caller is subscribed,
an interface used,
an address or port used by a caller,
a called party, and
on a quality marking of data packets that are received.

7. The telecommunication device of claim 1, further comprising prioritizing the real-time traffic over the best effort traffic on the global transport network using a method selected from the group consisting of:
marking data packets,
reserving bandwidth,
selecting a specific network,
selecting a specific subnet, and
selecting a specific network interface.

8. The telecommunication device of claim 1, further comprising a plurality of WAN interfaces for connecting to a plurality of WANs, at least one of the WANs having a different quality level.

9. The telecommunication device of claim 8, wherein real-time communication takes place on the local area network over both a WAN interface connected to an Internet and over a WAN interface connected to a higher-quality network.

10. The telecommunication device of claim 1, wherein a firewall protects the local area network from unwanted traffic from the global transport network.

11. The telecommunication device of claim 1, further comprising a registry for tracking a user's current location in the telecommunication device at the border between the global transport network and the local area network.

12. The telecommunication device of claim 1, further comprising a PBX.

13. The telecommunication device of claim 1, further comprising an access modem for connecting to the global transport network selected from the group consisting of:
a DSL modem,
a cable modem,
a GPON modem,
an Ethernet router,
MPLS router, and
a T1 router.

14. The telecommunication device of claim 1, further comprising a gateway for communicating with a second network, the gateway making the second network compatible with the telecommunication device.

15. The telecommunication device of claim 14, wherein the second network is the Public Switched Telephone Network.

16. The telecommunication device of claim 1, further comprising a gateway for communicating with a second telecommunication device on the local area network.

17. The telecommunication device of claim 16, wherein the second communication device is for the Public Switched Telephone Network.

18. The telecommunication device of claim 17, wherein the second communication device is a telephone or a PBX.

19. A non-transitory computer readable storage medium wherein a software module for inclusion into a telecommunication device according to claim 1 implements the elements of said telecommunication device.

20. A system for communication using telecommunication devices according to claim 1.

21. A system for communication using telecommunication devices according to claim 20, where said application is a telephone call, an SMS message, an MMS message or a gaming application.

* * * * *